March 1, 1927.
W. H. FITTS
THERMOMETER
Filed July 7, 1920
1,619,109
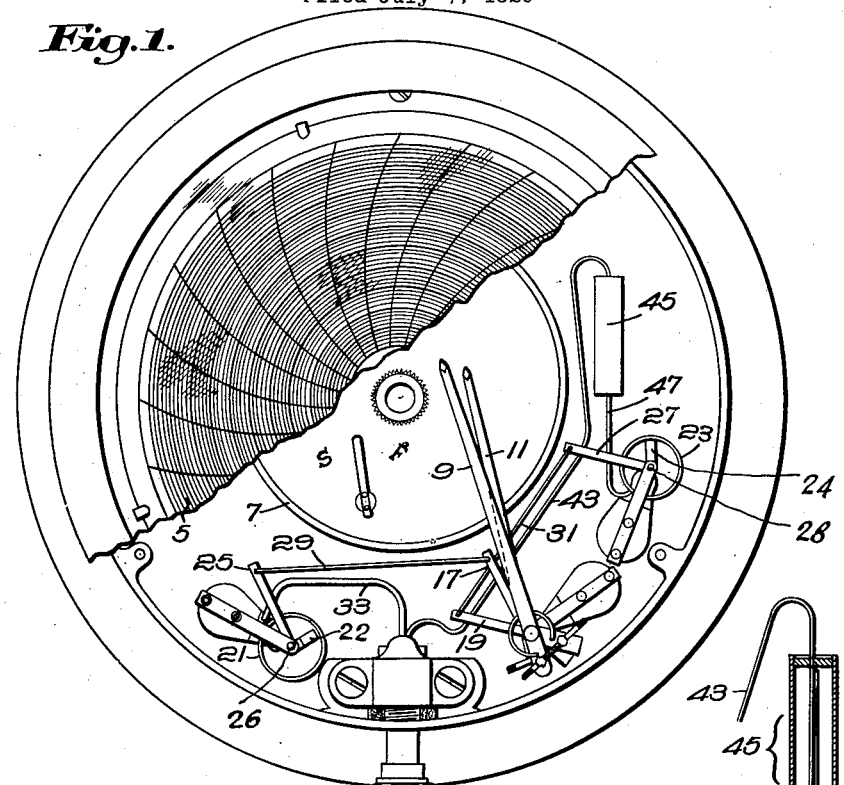
Fig. 1.
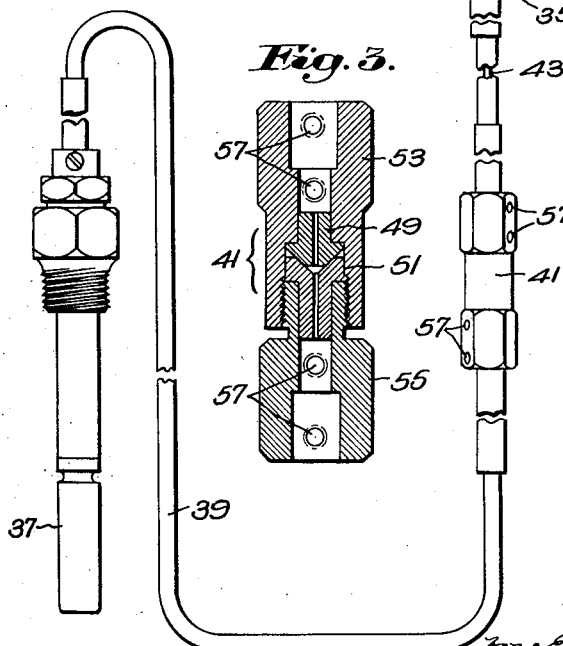
Fig. 3.
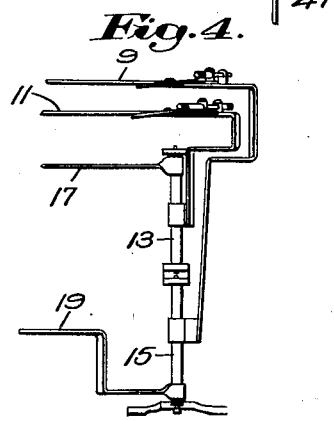
Fig. 2.
Fig. 4.
Inventor:
Walter H. Fitts,
by Emery, Booth, Janney & Varney
Attys.

Patented Mar. 1, 1927.

1,619,109

UNITED STATES PATENT OFFICE.

WALTER H. FITTS, OF FOXBORO, MASSACHUSETTS, ASSIGNOR TO THE FOXBORO COMPANY, OF FOXBORO, MASSACHUSETTS, A CORPORATION OF MASSACHUSETTS.

THERMOMETER.

Application filed July 7, 1920. Serial No. 394,506.

This invention relates to measuring instruments and more particularly to thermometers of that type measuring temperature by the pressure effects thereof.

My invention will best be understood by reference to the following description of an illustrative embodiment thereof shown by way of example in the accompanying drawings, wherein:

Fig. 1 is a front elevation of the instrument partially broken away;

Fig. 2 is a section on an enlarged scale of an expansion chamber or trap;

Fig. 3 is a section on an enlarged scale of a union used in the instrument; and

Fig. 4 is a view of the index carrying mechanism.

The embodiment of my invention chosen for purposes of illustration is a dial instrument of the recording type having the usual polar chart 5 adapted to be revolved by a clock movement 7 and with which cooperate the indices or pens 9 and 11. The instrument shown has two such indices adapted to record on the same chart for direct comparison pressure conditions and temperature conditions, usually those at the source of pressure. An instrument of this nature has various uses. For example in a digestor for sulphate pulp considerable heat is evolved on account of the chemical reaction and it is desirable to have a record of the real temperature as well as the pressure inside the digestor. In a vulcanizer for rubber articles air is inside the vulcanizing chamber and if steam is admitted for vulcanizing purposes a true deduction as to temperature conditions cannot be had from the pressure alone.

Here (see Fig. 4) I have shown the indices 9 and 11 as mounted respectively on the aligned shafts 13 and 15 which are provided with the crank arms 17 and 19. Laterally disposed pressure sensitive devices 21 and 23 which may be in the form of the well known helical tubes are operatively connected to the indices to transmit motion thereto as the sensitive devices move under the influences of pressure. These tubes are preferably of the type shown in United States Patent 1,195,334 to E. H. Bristol, dated August 22, 1916, and as described in that patent these tubes 21 and 23 operate through radially flexible connections 22 and 24 respectively to turn axially disposed shafts 26 and 28 respectively. On these shafts are mounted crank arms 25 and 27, parallel respectively to the crank arms 17 and 19 and connected thereto by the connecting rods 29 and 31. This arrangement facilitates the assembly of the parts as each pressure sensitive element is removed from the pens and is readily accessible as a unit independently of the rest of the mechanism.

In the example shown the member 21 is adapted to be subjected directly to pressure through a suitable pipe connection 33 joined with the source of pressure by the union 35 on the exterior of the case. The pressure sensitive device 23, on the other hand, is adapted to be subjected to the pressure due to changes in temperature, constituting in fact the thermometer, and for this purpose it is connected to the liquid containing bulb 37 from which extends a capillary pipe conveniently enclosed in a protecting armor 39 and conveniently joined by disconnectible union 41 to a similar capillary pipe 43 (see Fig. 1) through the chamber 45 presently to be described and the pipe 47 to the pressure sensitive device 23. The union 41 may be of any desired form but I have herein shown elements 49 and 51 having respectively concave and convex heads to fit together and having suitable bores to receive the capillary pipes. The heads of the members 49 and 51 are pressed together by the sleeves 53 and 55 having interior shoulders engaging the shoulders of the heads and which are threaded together. The sleeves 53 and 55 may be suitably recessed as shown to receive the armoring of the tubing which may be held in place in the sleeves by the set screws 57.

This arrangement permits the bulb 37 and the piping leading thereto to be filled either with a gaseous fluid or with a suitable liquid, as water, apart from the instrument. The union may be disconnected and the gage tested by direct pressure and the liquid filled bulb then attached.

When the bulb is exposed to an elevated temperature the liquid is vaporized and the vapor pressure acting on the tube 23 moves the index 9. To insure that the pressure operating the tube 23 is vapor pressure and not liquid pressure and to prevent the liquid being carried over into the device 23 the expansion chamber or trap 45 may be interposed in the connection between the union 41 and the device 23. Referring to Fig. 2 this may be a chamber of sufficient capacity to accommodate any increased volume of liquid which may be due to the expansion of the liquid as such under changes of temperature within the range of the instrument. Conveniently also this expansion chamber is made in the form of a trap to prevent liquid from passing into the pipe 47 and for this purpose the pipe 43 may enter the chamber at the top and extend downwardly to a point near the bottom thereof and the pipe 47 at the bottom and extend upwardly past the pipe 43 for a considerable distance as indicated. Thus if liquid is forced through pipe 43 it will be trapped in the chamber and will not enter pipe 47.

Having thus described in detail the particular embodiment of my invention shown by way of example in the accompanying drawings, the features of novelty exemplified thereby which I desire to secure by Letters Patent I shall express in the following claims:

1. A thermometer operating by vapor tension comprising a pressure sensitive device, a remote liquid containing bulb and a connection therebetween including an expansion chamber of capacity to accommodate the increased volume of the liquid as such under changes of temperature to which the bulb is subject.

2. A thermometer comprising a pressure sensitive device, a liquid containing bulb, and expansion chamber of capacity to accommodate the increased volume of the fluid as such under changes of temperature to which the bulb is subject, a pipe extending from the sensitive device and opening adjacent the top of the chamber and a pipe extending from the bulb and opening near the bottom of the chamber.

3. A thermometer comprising a pressure sensative device, a liquid containing bulb, an expansion chamber of capacity to accommodate the increased volume of the fluid as such under changes of temperature to which the bulb is subject, and pipes from the device and the bulb entering the chamber at bottom and top respectively and extending therein past one another.

4. A thermometer operating by vapor tension comprising a pressure sensitive device, a liquid containing bulb, a pipe connection therebetween including a disconnectible union whereby the bulb may be filled and an expansion chamber interposed in the connection between the union and the sensitive device and of capacity to accommodate the increased volume of the fluid as such under changes of temperature to which the bulb is subject.

5. A dial instrument having a pair of aligned shafts, indices moved thereby, crank arms on the shafts, laterally disposed pressure sensitive devices, crank arms operated thereby and connecting rods between the arms of said devices and the arms of the shafts.

6. A dial instrument of the class described having a pair of substantially coaxial index shafts, laterally disposed shafts having linkage connections to said index shafts respectively and separate pressure sensitive devices for operating said laterally disposed shafts.

7. A dial instrument of the class described having a pair of substantially coaxial index shafts, laterally disposed shafts having linkage connections to said index shafts respectively and separate pressure sensitive devices for operating said laterally disposed shafts comprising helical pressure sensitive tubes organized substantially coaxially with said shafts and radially flexible driving connections between each tube and its shaft.

8. A recording instrument of the class described having a case and a rotating dial, a pair of substantially coaxial shafts disposed adjacent the margin of the dial, pen arms carried thereby to sweep across the dial from edge to center thereof, a pair of pressure sensitive mechanisms including driven shafts laterally disposed and occupying separated segments of the interior of the case and motion transmitting means between the shafts of said mechanisms and the pen arm shafts.

9. A recording instrument of the class described having a case and a rotating dial, a pair of substantially coaxial shafts disposed adjacent the margin of the dial, pen arms carried thereby to sweep across the dial from edge to center thereof, a pressure sensitive mechanism including a driven shaft laterally disposed in a segment of the case adjacent said pen arm shafts, link-work connecting said driven shaft to a pen arm shaft and a separate pressure sensitive device operatively connected to the other pen arm shaft.

In testimony whereof, I have signed my name to this specification.

WALTER H. FITTS.